United States Patent
Knorpp et al.

(10) Patent No.: US 6,618,689 B2
(45) Date of Patent: Sep. 9, 2003

(54) METHOD FOR THE NON-DESTRUCTIVE INSPECTION OF WALL STRENGTH

(75) Inventors: Ralph Knorpp, Stuttgart (DE); Dimitri Vitkin, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/947,241

(22) Filed: Sep. 5, 2001

(65) Prior Publication Data
US 2002/0095267 A1 Jul. 18, 2002

(30) Foreign Application Priority Data
Sep. 7, 2000 (DE) ......................... 100 44 169

(51) Int. Cl.⁷ .............................................. G01B 11/02
(52) U.S. Cl. ........................ 702/170; 702/35; 702/36; 702/97; 702/155; 702/158; 700/96; 700/182; 700/115; 382/141; 382/152; 382/154; 356/630; 356/631; 356/635
(58) Field of Search ........................ 702/170, 35, 36, 702/97, 155, 158; 700/96, 182, 115; 382/152, 141, 154; 356/630, 631, 635; G01B 15/04, 21/16; G01N 24/08, 24/10; A61B 5/55, 6/03

(56) References Cited

U.S. PATENT DOCUMENTS

| 4,725,963 A | * | 2/1988 | Taylor et al. | ................. 702/40 |
| 5,521,847 A | | 5/1996 | Ostrowski et al. | .......... 364/559 |
| 5,857,032 A | * | 1/1999 | Wang et al. | ................. 382/154 |
| 5,953,444 A | | 9/1999 | Joseph et al. | ................ 382/131 |
| 6,047,041 A | | 4/2000 | Ellinger | ........................ 378/58 |
| 2002/0114508 A1 | * | 8/2002 | Love | ........................... 382/154 |

FOREIGN PATENT DOCUMENTS

| DE | 3431763 A1 | 3/1985 |
| DE | 4428364 A1 | 12/1995 |
| DE | 4436263 A1 | 4/1996 |
| DE | 4438993 C2 | 2/1998 |
| EP | 0875751 | 11/1998 |

* cited by examiner

Primary Examiner—John Barlow
Assistant Examiner—Meagan Walling
(74) Attorney, Agent, or Firm—Davidson, Davidson & Kappel & LLC

(57) ABSTRACT

A method for non-destructively inspecting the wall thickness of a component, where the dimensions of the component or of the component surface are measured, substantially without making any contact, and are described by digital data. In accordance with the present invention, a multiplicity of the component's surface points, which substantially completely describe the component, is automatically calculated in a three-dimensional coordinate system. Starting from each of the surface points, going out in one direction that runs perpendicularly to the surface point into the material, one scans for at least one opposite surface point. The wall thickness of the component at the surface point is ascertained as the distance between the surface point and the at least one opposite surface point. The component is visually displayed and, in the visual display, surface points are highlighted for which the wall thickness falls below and/or exceeds one or more predefined values. The present invention renders possible a reliable and complete, automatic determination of wall thickness and a rapid evaluation of components and/or of critical wall thicknesses.

6 Claims, 3 Drawing Sheets

METHOD FOR THE NON-DESTRUCTIVE INSPECTION OF WALL STRENGTH

BACKGROUND OF THE INVENTION

The present invention is directed to a method for non-destructively inspecting the wall thicknesses or strength of a component, where the dimensions of the component or of the component surface are measured, substantially without making any contact, and are described by digital data.

Mechanically and thermally stressed components, such as aggregate parts (cylinder heads, shafts, etc.) or engine components (e.g., turbine blades), need to be inspected to check for adherence to minimum wall thicknesses. The inspection procedures for such components often specify a minimum value that the wall thickness must not fall below anywhere on the component. At the present time, the wall thicknesses of cylinder heads, for example, are examined by sawing the component into individual parts in order to make all locations accessible and by subsequently performing a manual inspection using a special dial gauge. Besides the fact that the component is destroyed, the main drawback of this method is that the lack of a reference to the component's coordinate system makes it difficult, in the event of a defect (thin wall), to infer the cause of the defect (e.g., displacement of a sand core if the component is a cast part).

The firms BIR, SMS and Aracor, etc. have computer tomography systems for the non-destructive inspection of components. Computer tomography provides a stack of two-dimensional gray-value sectional views through the component which can be individually displayed on a computer. In addition to these systems, there is also system software for examining selected wall thicknesses in individual, two-dimensional gray-value sectional views. The inspection is performed interactively with the user, i.e., a complete inspection is not automatically possible. The main disadvantage of this method is that the actual wall thicknesses may be smaller than the two-dimensional sectional views, since the section is generally not perpendicular to the wall.

SUMMARY OF THE INVENTION

An object underlying the present invention is to devise a method for non-destructively inspecting the wall thickness or strength of components which will make it possible to automatically capture, in reliable fashion, all actually occurring wall thicknesses, and which will enable the user to quickly evaluate the components and/or critical wall thicknesses.

The present invention provides a method for non-destructively inspecting the wall thickness or strength of a component, where the dimensions of the component or of the component surface are measured, substantially without making any contact, and are described by digital data, wherein a computer implements the following: (a) a multiplicity of the component's surface points, which substantially completely describe the component, is automatically calculated in a three-dimensional coordinate system; (b) starting from each of the surface points, going out in one direction that runs substantially perpendicularly to the surface of the component at the surface point, into the material, one scans for at least one opposite surface point; (c) the wall thickness of the component at the surface point is ascertained as the smallest distance between the surface point and the at least one opposite surface point; and (d) the component is visually displayed and, in the visual display, surface points are highlighted for which the wall thickness falls below and/or exceeds one or more predefined values.

Thus, starting from each of the surface points, going substantially in a normal direction into the material, one scans for surface points on an opposite surface, to reliably find the smallest material thickness everywhere.

Here, "substantially in a normal direction" signifies that, proceeding in a normal or perpendicular direction into the material, a target point on the opposite surface is initially sought and acquired. Then, within a tolerance range to be preset around the target point, other points are selected, and their distance to the starting point is defined. The smallest distance indicates the particular material thickness.

At first glance, this type of search may not provide the actual material thickness. For example, when the component is bounded on mutually opposing sides by surfaces having different curvatures, it may occur that the search from one side does not provide the smallest material thickness. In such a case, however, one obtains the correct material thickness from any surface point on the other side, since the calculation is made for all surface points. Thus, the actual material thickness to one surface point is the smallest value that one obtains starting from this surface point or from any other surface points, in the direction of the first considered surface point.

The method of the present invention can be implemented fully automatically. The user merely needs to enter the limit values for the wall thickness, the component's adherence to which is to be tested. In the visual representation, for example in a screen display, all surface points are then highlighted, for which the calculation revealed that the wall thickness falls below and/or exceeds the limit values. For example, in a three-dimensional black-white display of the component on the screen, those locations can be marked in color where the wall thickness is smaller than a preset minimum value or where the wall thickness is between an upper and a lower limit value. Particularly when the depicted component is transparent or is rotatable on the screen, the user can very easily recognize whether the component has any regions having a critical wall thickness.

The three-dimensional coordinate system used for visualizing the component is advantageously the same as the one containing the component's measurement data subsequent to the measurement, for example Cartesian coordinates or cylinder coordinates. The uniform coordinate system makes it possible to draw from ascertained anomalies (e.g., thin walls) to specifically infer the causes of the defects (e.g., displacement of a sand core if the component is a cast part).

The component is precisely measured in three dimensions, preferably using optical 3-D coordinate metrology (e.g., laser scanners, strip-projection sensors, etc.) or tomographic measuring instruments (e.g., X-ray computer tomographs). By properly selecting the measuring instrument, one can thoroughly measure the dimensions of the components, including any existing internal structures. The result is a digital representation of the component, which can exist in one of the following forms: (a) a stack of three-dimensional, gray-value sectional views through the component or a three-dimensional voxel data record (a voxel is a small element of volume having a gray value, which is a measure for the density of the component in this element of volume); (b) a dense point cloud, which describes the surface of the component; (c) a triangulation, which describes the surface of the component.

Each of these three cases provides a digital description of the actual state of a component upon which to base the automatic analysis of the component's wall thicknesses.

In the first case, from a voxel data record, one calculates surface points of the component, utilizing the fact that the gray value of the voxels at the surfaces of the component generally does not change abruptly from one value to another.

This means that, as surface points, one takes, for example, the midpoints of voxels, which have a gray value that lies within a predefined range between the gray value of the material of the component and the gray value of regions in which there is no material. These points, which lie on or in the vicinity of an ISO gray-value surface, form a dense point cloud.

In the case that the component is described by a stack of three-dimensional gray-value sectional views, one can perform the above calculation analogously on the pixels of the gray-value sectional views, and subsequently describe the locations of the obtained surface points in the three-dimensional coordinate system. Or one first combines the gray-scale sectional views and obtains a three-dimensional voxel data record in which each voxel corresponds to one small volume in the coordinate system used and has an associated gray value. For this, commercial software modules are already available, e.g., the software MIMICS of the firm MATERIALISE or the software VG STUDIO MAX of VOLUME GRAPHICS.

A local tangential plane is then determined for each surface point using a correction method, with the assistance of other surface points in its vicinity. The direction in which one subsequently scans for other component surfaces is the local normal on the local tangential plane, i.e., the normal vector of the tangential plane which points into the material.

In the second case, where the measuring technique calls for describing the surface of the component by a dense point cloud, a correction method is used for every surface point to determine a local tangential plane, whose local normal is given by the normal vector of the tangential plane.

In the third case, where the measuring technique calls for describing the surface of the component by a triangulation, any points of the triangles, but preferably the centroids of the triangles, may be taken as the surface points of the component, the local normal, i.e., the search direction for each surface point, being given, for example, by the normal vector of the corresponding triangle.

BRIEF DESCRIPTION OF DRAWINGS

Additional features and advantages of the present invention are derived from the following description of exemplary embodiments and from the drawing, in which.

DETAILED DESCRIPTION OF A PREFERRED EMBODIMENT

Figure 1:
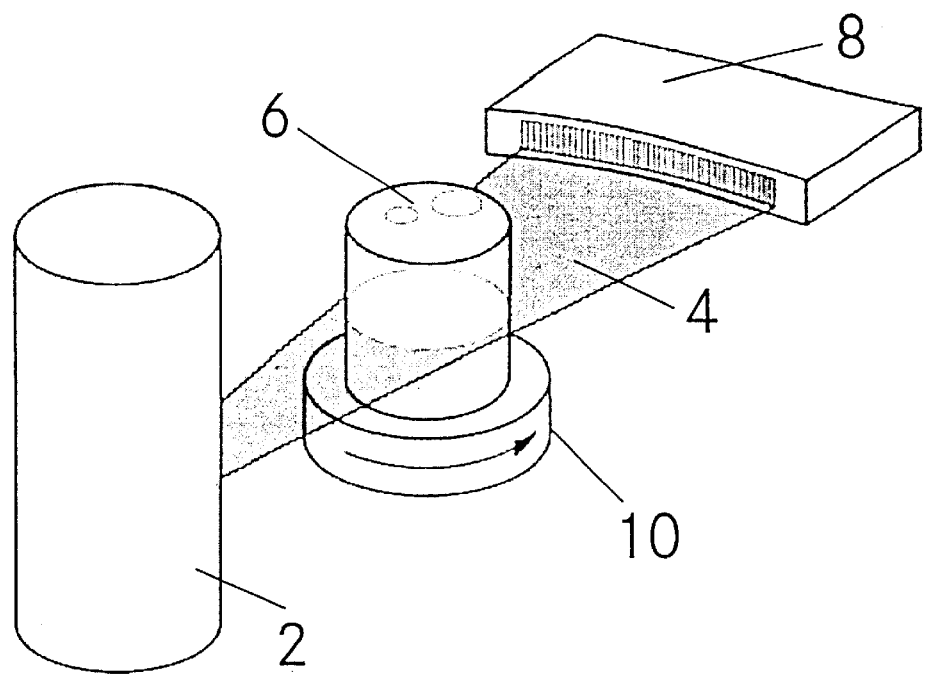
FIG. 1 shows a block diagram of a computer tomograph for inspecting components.
Figure 2:
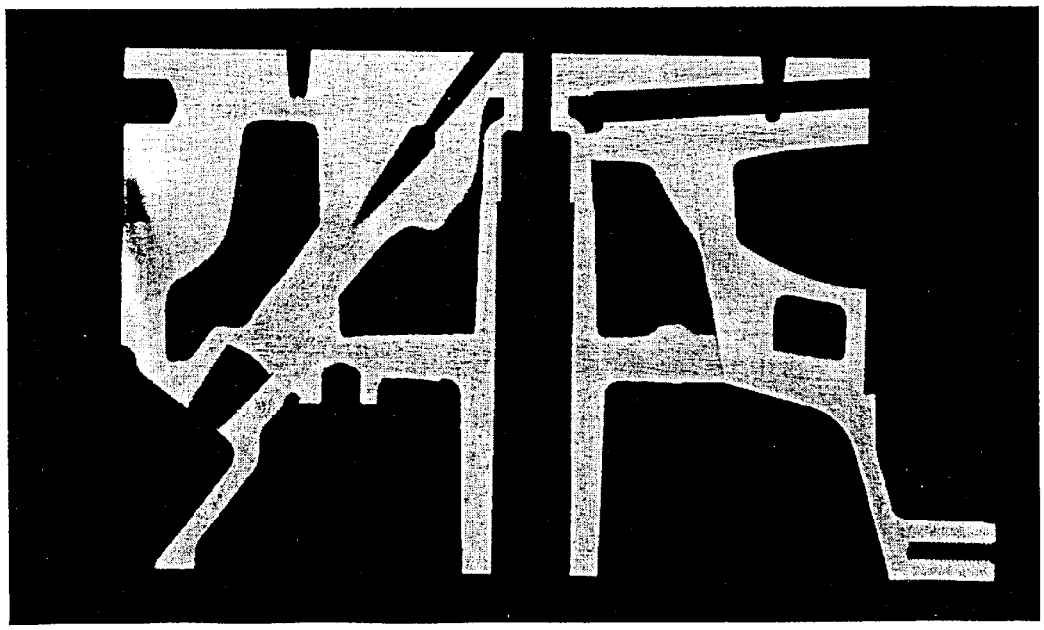
FIG. 2 shows one of many two-dimensional, gray-value sectional views of a component.

In FIG. 1, an X-ray tube 2 radiates X-rays 4 through a component to be inspected, onto a detector 8. Component 6 can be rotated, as well as raised and lowered, by a manipulator 10. Following full X-ray examination of component 6, a computer (not shown) of the computer tomograph supplies a stack of approx. 1000 gray-value sectional views, for example, at spatial intervals of 0.5 mm, in parallel, horizontal planes, each image having a resolution of, for example, 0.2 mm×0.2 mm. The gray values are, for example, within a range of between 0 (black, air) and 255 (white, material). FIG. 2 illustrates one of many two-dimensional gray-value sectional views of a component which stands out as lighter areas against a dark background.

If one joins all gray-value sectional views, one obtains a three-dimensional voxel data record. In the above example, one voxel in a Cartesian coordinate system corresponds to a volume of 0.2 mm×0.2 mm×0.5 mm and has a gray value within a range of 0 through 255.

Voxels, which are situated at the material-air boundaries, are represented by points which can be selected, for example, as the midpoints of these voxels. Together, these points form a dense point cloud, which describes the surface of the component.

Figure 3:
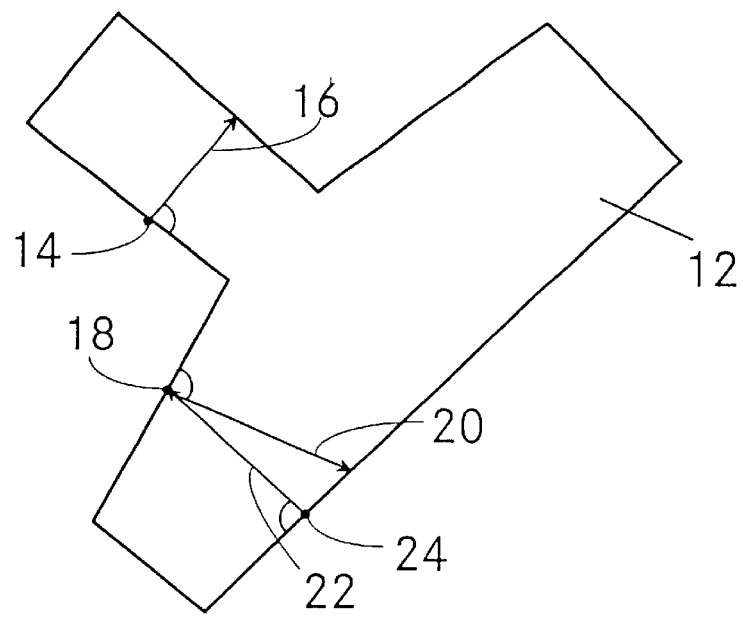
FIG. 3 shows a sectional view through a component, on which a wall thickness inspection is to be performed.

FIG. 3 is a sectional view through a component 12, on which a wall thickness inspection is to be performed. The wall thickness associated with a surface point 14 is determined by placing a local normal 16 perpendicularly into the material. The distance between surface point 14 and the location where local normal 16 emerges from component 12, is the wall thickness at this location.

In the case of a point cloud that describes the surface of the component, such a local normal is obtained, for example, by calculating a local tangential plane for every point of the point cloud, on the basis of points in the vicinity. In order for the calculated tangential plane to correspond as precisely as possible to the actual tangential plane at this location, one performs a compensating calculation on the basis of a number of surrounding points. The normal on the local tangential plane is then local normal 16.

As is discernible in FIG. 3, it may be that the wall thickness calculation performed by forming the normal for some surface points, such as a surface point 18 having distance 20, does not result in the smallest distance to an opposite surface. However, one obtains the smallest distance 22 at this location, as soon as the calculation yields a point 24 at the opposite side of the component. When inspecting the components for minimum wall thicknesses, it suffices to always take the distance along local normal 16 as a wall thickness, and to indicate each instance where the value falls below this minimum. However, if the intention is to indicate wall thicknesses that range within specific limits, one must avoid ambiguities. In such a case, one simply eliminates the lengths of the longer distances that pass through surface point 18, i.e., in the above example, distance 20.

If the surface of the component is not described by a dense point cloud, as in the above example, but by a triangulation, the local wall thickness is ascertained in the following, more closely described manner.

Figure 4:
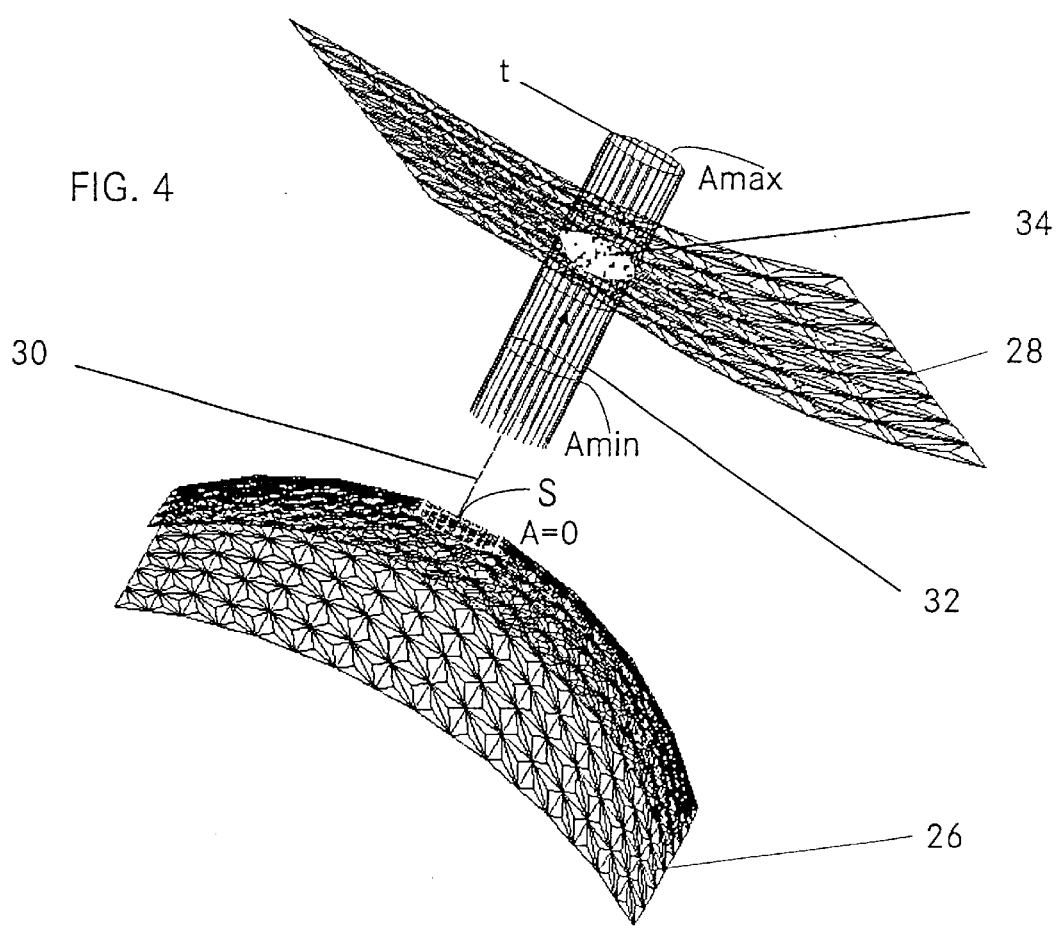
FIG. 4 shows a perspective sketch for elucidating a search method on the basis of a triangulation which describes a component.

FIG. 4 depicts two mutually opposing surfaces 26 and 28 of a component that has been scanned using 3-D coordinate metrology, resulting in a triangulation that describes surfaces 26 and 28. The material of the component extends between surfaces 26 and 28.

First, the centroid of each triangle is calculated. One after another, a local surface normal through the centroid is calculated for each triangle and for its three neighboring triangles. It is advantageous to include the neighboring triangles in order to compensate for local surface defects or measuring errors. When working with a more coarsely meshed triangulation, however, it may also suffice in each instance to calculate the local surface normal of the individual triangles.

Disposed on the local surface normal is one normal vector 30 which points from centroid S into the material of the component. Here, we will assume that a variable distance along normal vector 30 has the length A, i.e., at centroid S, A=0.

In this example, one scans for locations on the component where the wall thickness is between a lower limit value Amin and an upper limit value Amax. The values Amin and Amax are entered by the user before carrying out the procedure. Moreover, the applicant enters a search tolerance t, which represents the diameter of a cylinder around the surface normal in which one scans between distances Amin and Amax, starting from surface 26, for other component surfaces (in FIG. 4, surface 28).

Scan region 32 is a cylinder having diameter t, which extends lengthwise between Amin and Amax, as shown in FIG. 4. All centroids or corner points 34 of triangles on surface 28, which lie within scan region 32, as well as their distance from centroid S of the output triangle on surface 26 are ascertained and stored. The smallest of these values is the sought after wall thickness between surfaces 26 and 28.

Once all triangles have been analyzed, as described above, the component or relevant part thereof is displayed in a perspective view, for example by a CAD program, on a screen, and all surface points situated in the scan regions 32 in question are shown in the visual display, in a color that contrasts with that of the component. This means that regions of the component having wall thicknesses between Amin and Amax are highlighted in the display and can be observed more closely, e.g., by rotating the perspective display virtually, as is possible when using CAD programs.

The color used for displaying the located regions on the screen can be automatically selected as a function of the local wall thickness. If the wall thicknesses in the located regions vary, then a display is obtained in rainbow colors, each color of these representing a wall thickness. The wall thicknesses associated with each color may be indicated as numerical values along a color spectrum that is likewise shown on the screen, so that the corresponding numerical values are immediately revealed to the user.

In addition to the above described visual display, the CAD program can provide a great deal of other useful information, such as numerically indicating any existing displacement in the located regions from predefined setpoint positions.

Figure 5:
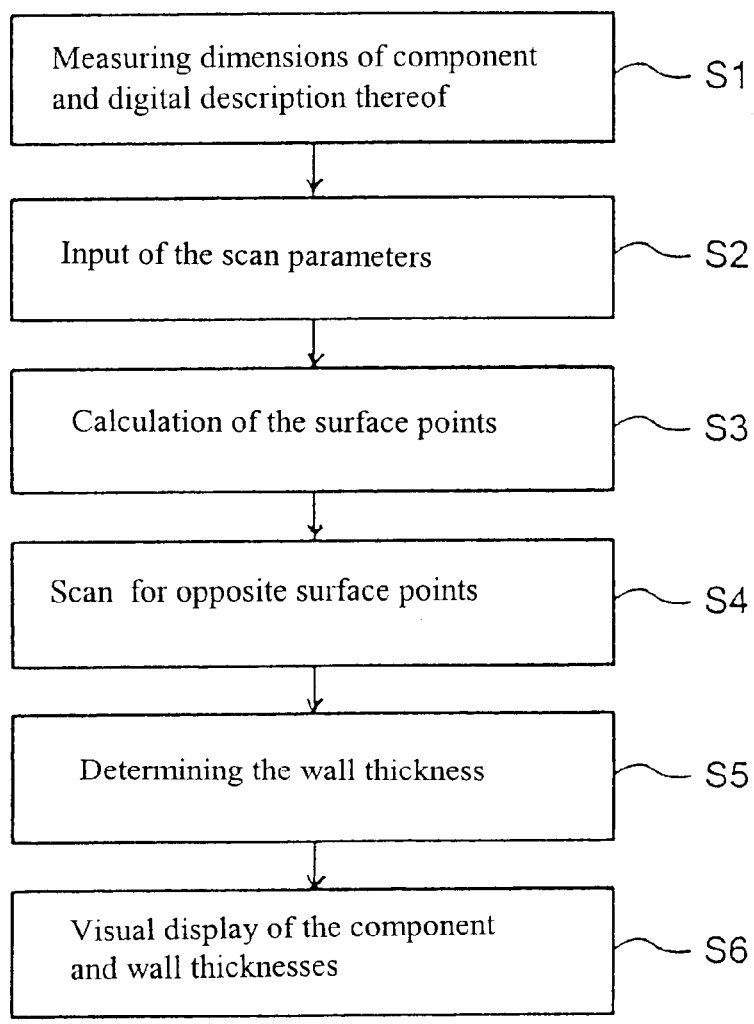
FIG. 5 shows a flow chart for clarifying the essential method steps of the non-destructive wall thickness inspection.

FIG. 5 summarizes the essential method steps involved in the described non-destructive wall thickness inspection.

In a method step S1, the dimensions of the component or component surface are measured using computer control, substantially without making any contact, and are described by digital data which are then stored. In a method step S2, the user enters the desired scan parameters, for example the above mentioned parameters t, Amin and Amax. In a method step S3, a multiplicity of the component's surface points, which substantially completely describe the component, is automatically calculated in a three-dimensional coordinate system. In a method step S4, starting from each of the surface points, going out in one direction that runs perpendicularly to the surface of the component at the surface point, into the material, one scans for at least one opposite surface point. In a method step S5, the wall thickness of the component at the surface point is ascertained as the distance between the surface point and the at least one opposite surface point. Finally, in a method step S6, the component is visually displayed, and, in the visual display, surface points are highlighted for which the wall thickness corresponds to the scan parameters and/or deviates therefrom in some way.

What is claimed is:

1. A method for nondestructively determining a wall thickness of a component, where the dimensions of the component or of a component surface are measured without substantial contact and are described by digital data, the method comprising the steps of:
   automatically calculating a plurality of surface points of the component so as to describe the component in a three-dimensional coordinate system;
   starting from each of the plurality of surface points, searching for at least one opposite surface point in a first direction that runs substantially perpendicularly to a surface of the component at the surface point into the material;
   ascertaining a wall thickness of the component at the surface point as a smallest distance between the surface point and the at least one opposite surface point; and
   visually displaying the component, and, in the visual display, highlighting surface points for which the wall thickness falls below or exceeds one or more predefined values.

2. The method as recited in claim 1, wherein the calculating of the plurality of surface points in the three-dimensional coordinate system includes measuring dimensions of the component to yield a gray value, the surface points of the component being calculated as points which have a gray value between the gray value of the material of the component and the gray value of regions in which no material of the component is located.

3. The method as recited in claim 1, wherein the calculating of the plurality of surface points includes measuring dimensions of the component to yield a point cloud in the three-dimensional coordinate system, the surface points of the component being formed by the points of the point cloud in the three-dimensional coordinate system.

4. The method as recited in claim 1, wherein the calculating of the plurality of surface points includes measuring dimensions of the component to yield a triangulation in the three-dimensional space, the surface points of the component being calculated as predefined points of resulting triangles.

5. The method as recited in claim 1 wherein a computer executes the steps.

6. A computer-readable medium, having stored thereon, computer executable process steps operative to control a computer for nondestructively determining a wall thickness of a component, where the dimensions of the component or of a component surface are measured without substantial contact and are described by digital data, the steps including:
   automatically calculating a plurality of surface points of the component so as to describe the component in a three-dimensional coordinate system;
   starting from each of the plurality of surface points, searching for at least one opposite surface point in a first direction that runs substantially perpendicularly to a surface of the component at the surface point into the material;
   ascertaining a wall thickness of the component at the surface point as a smallest distance between the surface point and the at least one opposite surface point; and
   visually displaying the component, and, in the visual display, highlighting surface points for which the wall thickness falls below or exceeds one or more predefined values.

* * * * *